United States Patent [19]
Couturier et al.

[11] Patent Number: 6,138,543
[45] Date of Patent: Oct. 31, 2000

[54] BLADE MOUNTING ARRANGEMENT FOR CUT-OFF SYSTEM

[75] Inventors: Dennis P. Couturier, Washburn; Jie Ning, Ashland, both of Wis.

[73] Assignee: C. G. Bretting Manufacturing Company, Inc., Ashland, Wis.

[21] Appl. No.: 09/119,302

[22] Filed: Jul. 20, 1998

[51] Int. Cl.⁷ .................................................. B23D 25/12
[52] U.S. Cl. .............................. 83/348; 83/37; 83/698.31
[58] Field of Search .................... 83/37, 343, 348, 83/698.31, 341–3, 349, 663, 500, 505

[56] References Cited

U.S. PATENT DOCUMENTS

| | | |
|---|---|---|
| 2,478,240 | 9/1949 | Christman . |
| 3,247,746 | 4/1966 | Nystrand . |
| 3,264,921 | 8/1966 | Nystrand .................................. 83/342 |
| 3,709,077 | 1/1973 | Trogan et al. . |
| 3,733,949 | 5/1973 | Bradley . |
| 3,926,084 | 12/1975 | Blazer ...................................... 83/698 |
| 3,935,774 | 2/1976 | Craddy ..................................... 83/355 |
| 4,114,491 | 9/1978 | Hashimoto et al. . |
| 4,131,047 | 12/1978 | Schriber et al. .......................... 83/698 |
| 4,640,165 | 2/1987 | McMohon et al. .................. 83/348 X |
| 5,125,302 | 6/1992 | Biagiotti . |
| 5,224,408 | 7/1993 | Steidinger ............................. 83/698 X |
| 5,259,283 | 11/1993 | Michalik ............................... 83/348 X |
| 5,357,836 | 10/1994 | Stromberg et al. .................. 83/698.31 |
| 5,839,343 | 11/1998 | Michalik et al. .......................... 83/663 |

*Primary Examiner*—M. Rachuba
*Attorney, Agent, or Firm*—Michael Best & Friedrich LLP

[57] ABSTRACT

A blade mounting arrangement for mounting a cutoff blade in a roll of a shear cut type, cut-off system includes an elastomeric member interposed between the cutoff blade and a mounting surface of the roll. The elastomeric member is configured and arranged to provide varying resistance to compressive loading, the resistance varying along a portion of elastomeric member. In one embodiment, the elastomeric member includes a first resistance portion which engages the cutoff blade near a fixed inner edge portion of the blade, and a second resistance portion which underlies the cutoff blade near its free edge portion. The second resistance portion is thinner than the first resistance portion providing a gap between the free edge portion of the cutoff blade and the second portion, the free edge portion of the cutoff blade engaging the second resistance portion only when the cutoff blade is subjected to a load force that is greater than a predetermined value. The elastomeric member includes a third portion disposed intermediate the first and second portions and joining the first portion to the second portion but configured so as to be maintained out of engagement with the cutoff blade both for non-loaded loaded conditions for the free edge portion of the cutoff blade.

29 Claims, 4 Drawing Sheets

BLADE MOUNTING ARRANGEMENT FOR CUT-OFF SYSTEM

BACKGROUND OF THE INVENTION

This invention relates generally to shear cut systems for cutting webs of paper-like material, and, more particularly, to a blade mounting arrangement for such systems.

The existing technology for cut-off systems for cutting webs of paper-like material is well known. Representative perforation cut-off systems are shown in U.S. Pat. Nos. 2,478,240 and 3,247,747, for example. One characteristic of these prior art cut-off systems is the required close tolerance in the setting of the cutting blades to each other.

Very high stresses occur between the cut-off blade and the blade holder. This high stress concentration can cause blade cracking or fatigue failure. Moreover, because there is no damper in the system, the lower stiffness of the system is provided by the blade itself. Therefore, the cut-off blade will vibrate to release the dynamic energy due to the action of impact forces, which can result in miss-off.

The interference between the cutting blades is normally in the range of 0.004 to 0.010 inch. When the interference between the cutting blades is below 0.004 inch, cutting performance is jeopardized. When the interference between the cutting blades is above 0.010 inch, the cutting forces are high, the stress concentrations in the cutting blades are high which cause premature fatigue failure, and the higher forces cause vibrations. Vibrations can cause a change in the interference which causes cut-off performance reliability problems. As the cutting system (i.e., the web being cut) becomes wider, the close tolerance requirements cause problems.

There have been efforts to reduce the vibrations in the cutoff blades. Examples of systems designed to reduce vibrations are shown in U.S. Pat. Nos. 3,733,949 and 5,125,302. These patents disclose blade mounting arrangements which incorporate an elastomeric material in contact with the cut-off blade. The elastomeric material comprises a thin, flat pad that is generally rectangular in shape. Although this configuration provides for vibration damping, such configuration also establishes a specific relationship for cutting force, blade cutting interference, blade stress level and stress concentration.

In the blade mounting structure disclosed in U.S. Pat. No. 3,733,949, for example, the pad is sized to occupy most of the depth of the recess in which the cut-off blade is mounted, and leaves only a slight spacing or gap between the pad and the cut-off blade. Also, the planar pad extends generally coextensive with the free portion of the blade. These factors limit the ability to make adjustments for the stiffness of the system. Moreover, although this blade mounting arrangement reduces noise, it does not allow large interference between blades because it increases the stiffness of the whole system. Consequently, this mounting arrangement can cause premature failure of the blade if the interference between blades is not set up absolutely correctly. In addition, this known blade mounting arrangement does not allow the load to be controlled in accordance with the allowable deflection at the blade tip.

It is an object of the present invention to provide a blade assembly for a shear cut roll for perforating or cutting sheet material.

It is a further object of the present invention to provide an improved blade mounting arrangement for a cut-off blade of a shear cut type, cut-off system.

It is another object of the present invention to provide a blade mounting arrangement which reduces stress concentration between a cut-off blade and a blade holder of a shear cut type, cut-off system.

A further object of the invention is to maintain flexibility of a cut-off blade of a shear cut type, cut-off system.

Another object of the invention is to increase impact strength in a shear cut type, cut-off system.

Yet another object of the invention is reduce vibration and noise in a shear cut type, cut-off system.

SUMMARY OF THE INVENTION

The present invention provides a blade assembly for a shear cut roll for perforating or cutting sheet material. The blade assembly comprises a blade having an upper surface and a lower surface, and a blade mount for securing the blade to the roll. An elastomeric member is located between the lower surface of the blade and the roll. The elastomeric member is configured and arranged to provide varying resistance to compression loading, the resistance varying along a portion of the elastomeric member. In one embodiment, the resistance of the elastomeric member varies along the longitudinal axis of the elastomeric member. In another embodiment, the resistance varies along the width of the elastomeric member. The varying resistance of the elastomeric member can be provided by varying the thickness of the elastomeric member along the width of the elastomeric member, and/or by varying the thickness of the elastomeric member along the longitudinal axis of the elastomeric member.

Further in accordance with the present invention, there is provided a blade mounting arrangement and method for a shear cut type, cut-off system of the type that includes a strip of an elastomeric material located between the cutting blade and the cutting bedroll on which the cutoff blade is mounted. In accordance with the invention, the geometry of the elastomeric member is selected to optimize the relationships of cutting force, blade deflection, stress level and stress distribution in a manner which improves the overall performance of the cutting system.

In accordance with one preferred embodiment of the invention, the elastomeric member includes a first resistance portion of a first thickness for engaging the cutoff blade near its fixed inner edge portion, and a second resistance portion of a lesser thickness, which engages the cutoff blade near its free outer edge portion only when the cutoff blade is subjected to a load force that is greater than a predetermined value. The elastomeric member includes a third portion disposed intermediate the first and second portions and joining the first portion to the second portion. The third portion is configured so as to be maintained out of engagement with the cutoff blade when a load force is applied to the free outer edge portion of the cutoff blade. Preferably, the thickness of the second portion is greater than the thickness of the third portion. In addition, the width of the first portion is preferably greater than the width of the second portion, and the width of the second portion is preferably greater than the width of the third portion.

The blade mounting structure provided by the invention allows the load at the blade tip to be adjusted in accordance with the allowable deflection. The novel blade mounting allows large interference between the blades because it provides a large amount of flexibility even when the deflection of the cutoff blade is less than 0.012 inch. Moreover, the blade mounting arrangement according to the invention substantially eliminates the possibility of miss cut-off because the blade mount provides a large stiffness for the system when the blade deflection is greater than 0.012 inch.

The blade mounting structure provided by the invention significantly reduces the level of maximum stress in the blade which greatly increases the blade life. Moreover, the blade mounting structure according to the invention provides vibration damping and reduces noise in cut-off due to the nature of the blade support material.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

DETAILED DESCRIPTION OF PREFERRED EMBODIMENTS

Figure 1:
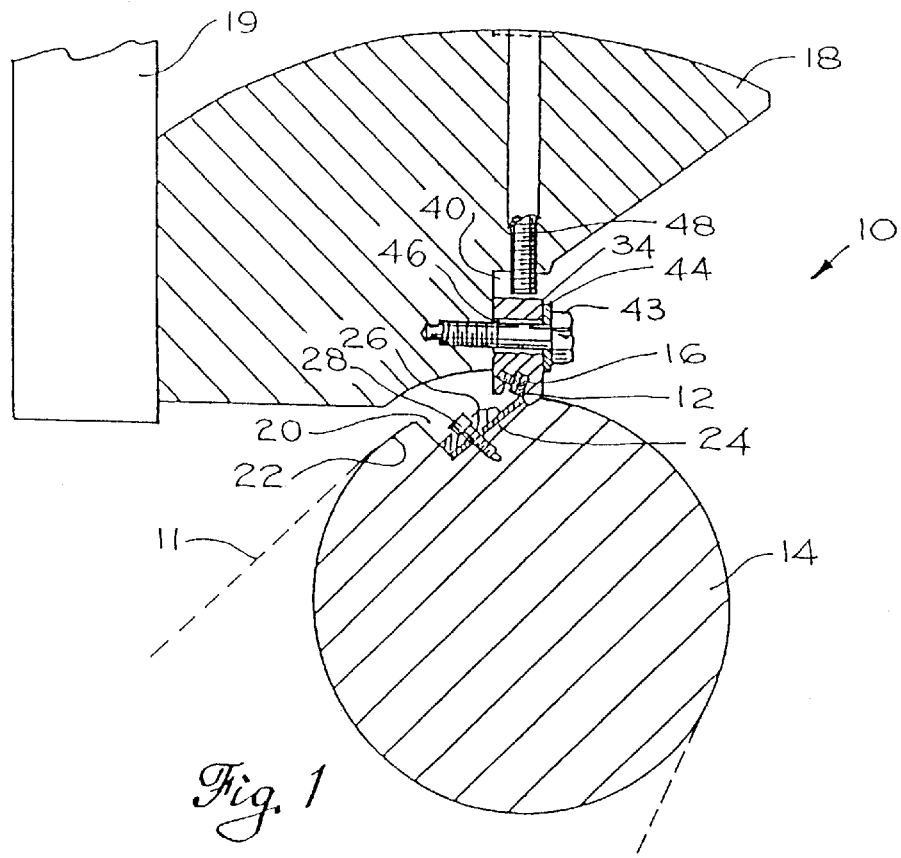
FIG. 1 is a vertical section view of a portion of a perforation cut-off apparatus incorporating the blade assembly in accordance with the invention.

Referring to FIG. 1 of the drawings, the blade assembly of the invention is described with reference to a shear cut-type, cut-off system 10 for perforating or cutting a web-like material represented by the dashed line 11. The cut-off system 10 includes a roll blade or cutoff blade 12 carried by a cutting bedroll or roll 14, and an anvil blade 16 mounted on an anvil block 18. The anvil block 18 is supported on a frame 19, only a portion of which is shown in FIG. 1. The roll 14 is mounted for rotation in a further portion (not shown) of the frame 19. The roll 14 includes an axially extending recess 20 in an outer surface 22 thereof and a rigid bearing surface 24 within the recess 20.

Figure 2:
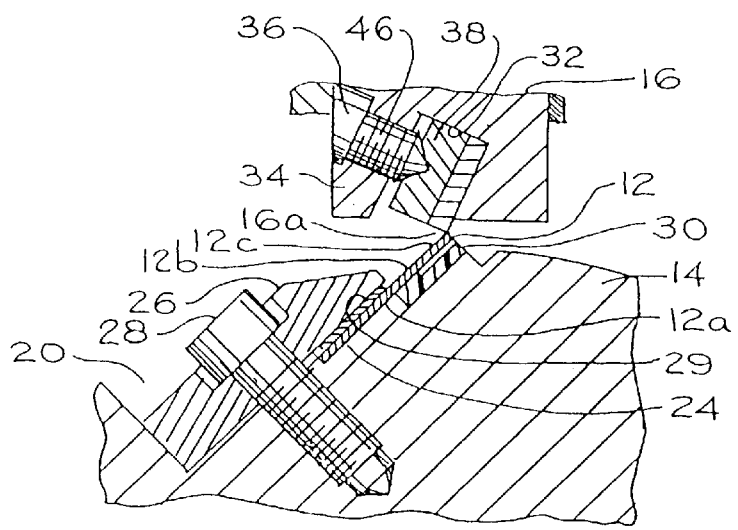
FIG. 2 is an enlarged fragmentary view of a portion of FIG. 1 and illustrating details of the blade assembly.

Referring also to FIG. 2, the cutoff blade 12 is rigidly supported by the rigid bearing surface 24 in the recess 20 which supports the lower or inner edge portion 12a of the cutoff blade 12. The cutoff blade 12 is clamped against the rigid bearing surface 24 by a clamp 26 and a bolt 28. The cutoff blade 12 has an inclined outwardly extending free or unsecured outer edge portion 12b provided with a cutting edge 12c.

A resilient, compressible member 30 of an elastomeric material, such as rubber or a polyurethane plastic, is located within the recess 20 and is positioned adjacent the cutoff blade 12. The elastomeric member 30 can extend substantially co-extensively with the free outer edge portion of the cutoff blade 12, extending from the inner edge portion 12a of the cutoff blade 12 to the cutting edge 12c of the cutoff blade 12. A resilient member 29 can be interposed between the clamp and the upper surface of the cutoff blade.

The anvil blade 16 is secured within a recess 32 in an anvil blade holder 34 by a set screw 36 and a clamping element 38. The blade holder 34 is secured against a bearing surface 40 of a cross beam or anvil block 42 by bolts 43 and spring washers 44. The blade holder 34 is provided with a through bore 46 for receiving the bolt 43. The bore 46 is larger than the bolt 43 to permit vertical adjustment of the blade holder 34 relative to the anvil block 42 by means of an adjusting screw 48.

The cutting edge 16a of the anvil blade 16 is positioned radially inwardly of the path of travel of the cutting edge 12c of the cutoff blade 12 to bring the edges of the blades into engagement during rotation of the roll 14. The cutoff blade 12 is flexed and the elastomeric member 30 is compressed by the cutoff blade when the cutting edge 12c of the cutoff blade 12 is impacted by the anvil blade 16 during rotation of the roll 14.

In accordance with the invention, the elastomeric member is configured and arranged to provide varying resistance to compressive loading, the resistance varying along a portion of the elastomeric member. To this end, the elastomeric member 30 is of a specific composition, geometry and size such that the following advantages are realized over known blade mounting arrangements for shear cut off systems. The relationship between deflection and force is changed as compared to known blade mounting arrangements which use a thin, substantially planar elastomeric element. Also, a change in the amount of blade tip deflection, or cutting interference, can be realized without a proportional increase load force.

This change in deflection versus force relationship provides several advantages. For example, acceptable cutting system tolerances are substantially increased, decreasing cutting system adjustments due to blade wear. Moreover, larger operating interferences are allowed without the proportional increase in cutting force required in the existing technology and the consequential vibration effects. The added deflection of the cutoff blade increases cutting performance while maintaining lower cutting force, blade stress and lower vibration levels.

In accordance with the invention, a varying resistance to compression loading can be established by the geometry and/or dimensions of the elastomeric member, by the nature and/or composition of the material, or by the structure and/or arrangement of the elastomeric member, for example. In one preferred embodiment, the resistance to compression loading is varied along the width of the elastomeric member by varying the thickness of the elastomeric member along the width of the member. For example, the elastomeric member can be stepped over at least a portion of a surface, defining a range of thicknesses along the width of the elastomeric member. Alternatively, the variable thickness of the elastomeric member can be produced by providing one or more projections, such as bumps or ribs, on a surface of the elastomeric member. Moreover, the resistance of the elastomeric member to compression loading can be varied along the length of the elastomeric member. For example, the elastomeric member can vary in thickness along the length of the member.

In one embodiment, the elastomeric member comprises a material that is substantially uniform in composition and/or density. However, the elastomeric member can comprise a material that is inhomogeneous in composition and/or density, allowing the elastomeric member to respond to compressive loading in a non-linear manner. In this way, an elastomeric member having substantially constant cross-sectional area along the length and width of the cutoff blade can provide varying resistance to compressive loading. In addition, the elastomeric member can comprise a plurality of individual sections having different resistance characteristics (determined by geometry and/or dimensions or by the nature and/or composition of the material), with the sections being assembled together as separate sections, or with the sections being joined together to form a unitary member.

Moreover, the novel geometric configuration of the strip of elastomeric material provided by the invention changes the stress distribution in the cutting blade. For given deflection values, the stress distribution produced using applicants' blade mounting arrangement is more evenly distributed and is not proportional to the force as compared to the existing technology. Therefore, undesirable stress concentration is reduced, thereby increasing fatigue limits.

Figure 3:
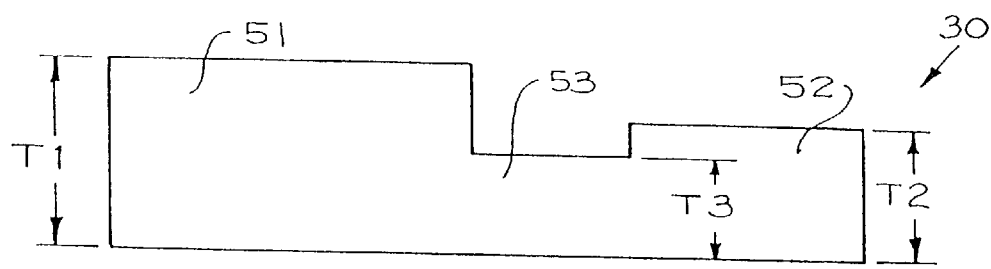
FIG. 3 is a side view of the elastomeric member of the blade assembly according to the invention.
Figure 4:
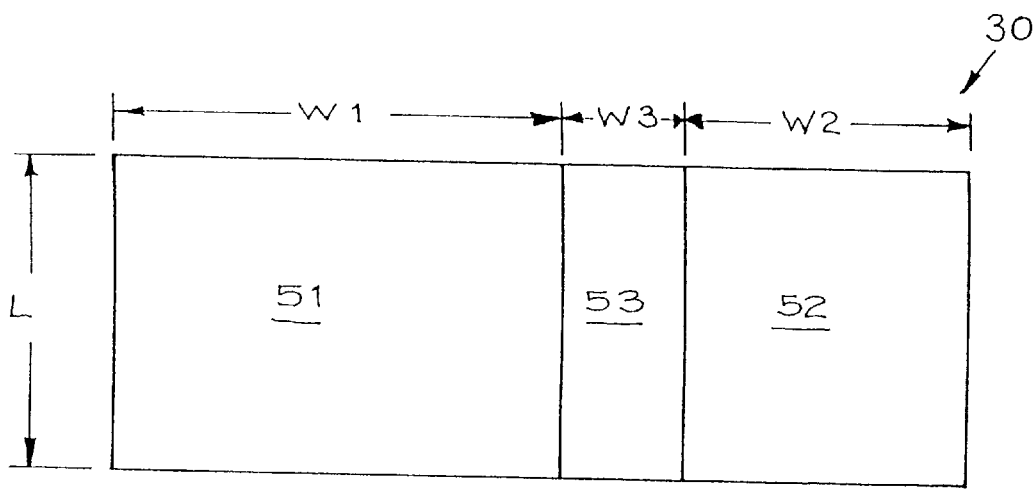
FIG. 4 is top plan view of the elastomeric member of FIG. 3.

Considering the elastomeric member 30 in more detail, FIGS. 3 and 4 show a side view and a top view, respectively, of the elastomeric member 30. The elastomeric member 30 defines a first resistance section or portion 51 which engages the cutoff blade 12 (FIG. 2) near its fixed inner end portion 12a. The elastomeric member 30 defines a second resistance section or portion 52 for engaging the blade near its outer or free edge portion 12b when the cutoff blade 12 is subjected to a load force that is greater than the predetermined value.

Figure 4A:
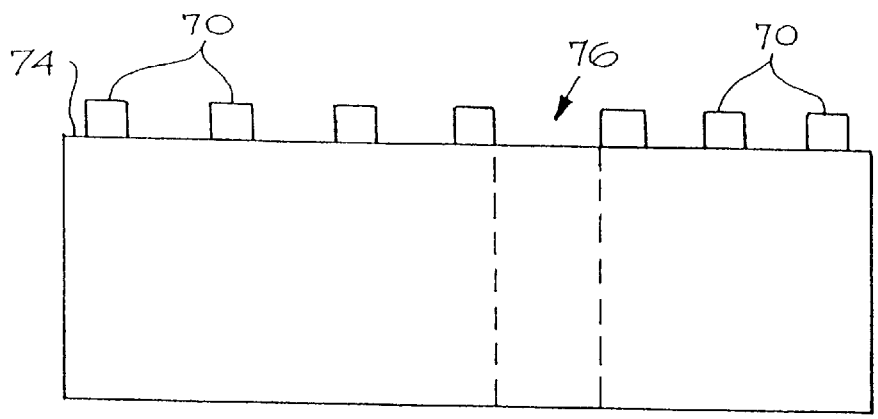
FIG. 4A shows an alternative embodiment for an elastomeric member.

The elastomeric member 30 includes a third section or portion 53 located intermediate the first and second portions and joining the first portion 51 to the second portion 52. The third portion 53 is configured to be maintained out of engagement with the cutoff blade 12 when a load force is applied to the cutoff blade. In one embodiment, the first and second portions are integral with the third portion. However, the elastomeric member 30 can be formed as three discrete portions. Moreover, the different thicknesses can be provided by projections 70 and 72, in the form of bumps or ribs of different thicknesses, for example, on a surface 74 of an elastomeric member 76, as shown in FIG. 4A.

In most highly preferred embodiments, the thickness T1 of the first portion 51 is greater than the thickness T2 of the second portion 52 along the width of the elastomeric member, and the thickness T2 of the second portion 52 is greater than the thickness T3 of the third portion 53 along the width of the elastomeric member. Thus, the third portion 53 defines a portion of reduced thickness between the ends 55 and 56 of the elastomeric member 30. The width W1 of the first portion 51 is preferably greater than the width W2 of the second portion 52, and the width of the second portion 52 is preferably greater than the width W3 of the third portion 53.

By way of example, the cutoff blade 12 can be approximately 0.50 inch wide and can have a free outer edge portion 126 that extends approximately 0.45 inch from the clamping point for the fixed inner edge portion 12a of the blade. For a blade having such dimensions, preferably, the width W1 of the first portion 51 of the elastomeric member is approximately 0.25 inch, the width W2 of the second portion 52 of the elastomeric member is approximately 0.15 inch, and the width W3 of the third portion 53 of the elastomeric member is approximately 0.05 inch. The thickness T1 of the first portion 51 is approximately 0.050 inch and the thickness T2 of the second portion 52 is approximately 0.040 inch. The length L of the of the elastomeric member can correspond to the length of the cutoff blade 12.

Figure 5:
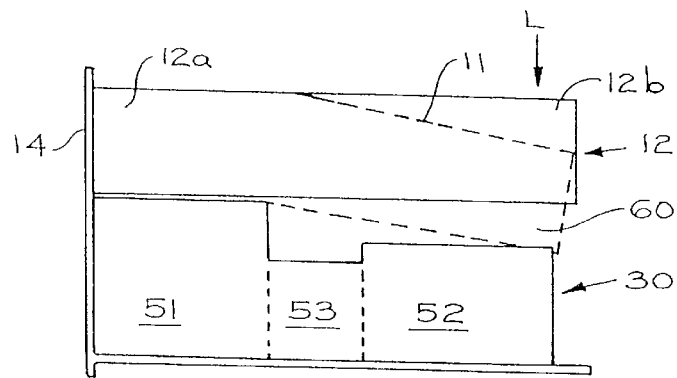
FIG. 5 is a simplified representation showing the elastomeric member according to the invention along with a cutoff blade and a roll of a perforation cut-off apparatus.

FIG. 5 is a simplified representation of the elastomeric member 30 according to the invention along with a cutoff blade 12 and roll 14 of the perforation cut-off system 10 (FIG. 1). As there shown, the first portion 51 of the elastomeric member 30 engages the underside of the cutoff blade 12 near its inner edge portion 12a. In the absence of a load on the outer edge portion 12b of the cutoff blade 12, the second portion 52 of the elastomeric member 30 is spaced apart from the cutoff blade 12, forming a gap 60 that is preferably approximately 0.010 inch. Thus, when a load is applied to the free outer edge portion 12b of the cutoff blade 12, the outer edge portion of the cutoff blade deflects freely for 0.010 inch before engaging the portion 52 of the elastomeric member 30. The third portion 53 of the elastomeric member 30 is also spaced from the cutoff blade 12. When a load L is applied to the free outer edge portion 12b of the cutoff blade 12, the free outer edge portion of the blade 12 deflects freely, as represented by the dashed line 11, until the outer edge portion 12b of the cutoff blade 12 engages the portion 52 of the elastomeric member 30. At such time, the elastomeric member 30 offers some resistance to further flexing of the outer edge portion 12b of the cutoff blade. Note that the cutoff blade 12 preferably does not engage the third portion 53 of the elastomeric member 30. In alternate embodiments of the invention, a relatively small area of the third portion 53 can contact the blade, so long as the flexibility of the cutoff blade 12 is not significantly reduced. The elastomeric member 30, in response to deformation of the cutoff blade 12 under load, exerts a distribution of reactive loads against the lower surface of the cutoff blade, the reactive loads having magnitudes corresponding in this embodiment to the thickness of the elastomeric element at respective points along the width of the cutoff blade.

Figure 6:
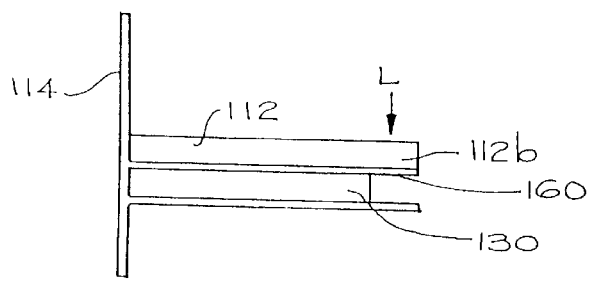
FIG. 6, which is labeled "Prior Art", is a view similar to that of FIG. 5 and showing a cutoff blade, elastomeric member and a roll of a known perforation cut-off apparatus.

FIG. 6, which is labeled "Prior Art", is a view similar to that of FIG. 5 and showing a cutoff blade 112, an elastomeric member 130 and a roll 114 of a known perforation cut-off system. In the absence of a load L on the outer edge portion 112b of the cutoff blade 112, the elastomeric member 130 is spaced apart from the cutoff blade 112 along its entire length defining a gap 160 that is approximately 0.005 inch. When a load L is applied to the outer edge portion 112b of the cutoff blade 112, the free edge portion 112b of the cutoff blade 112 deflects freely until the free outer edge portion 112b of the cutoff blade engages the elastomeric member 130, compressing the elastomeric member 130. In this prior art mounting arrangement, the cutoff blade 112 engages the elastomeric member 130 along substantially its entire length, greatly decreasing flexibility and increasing stress concentrations.

Figure 7:
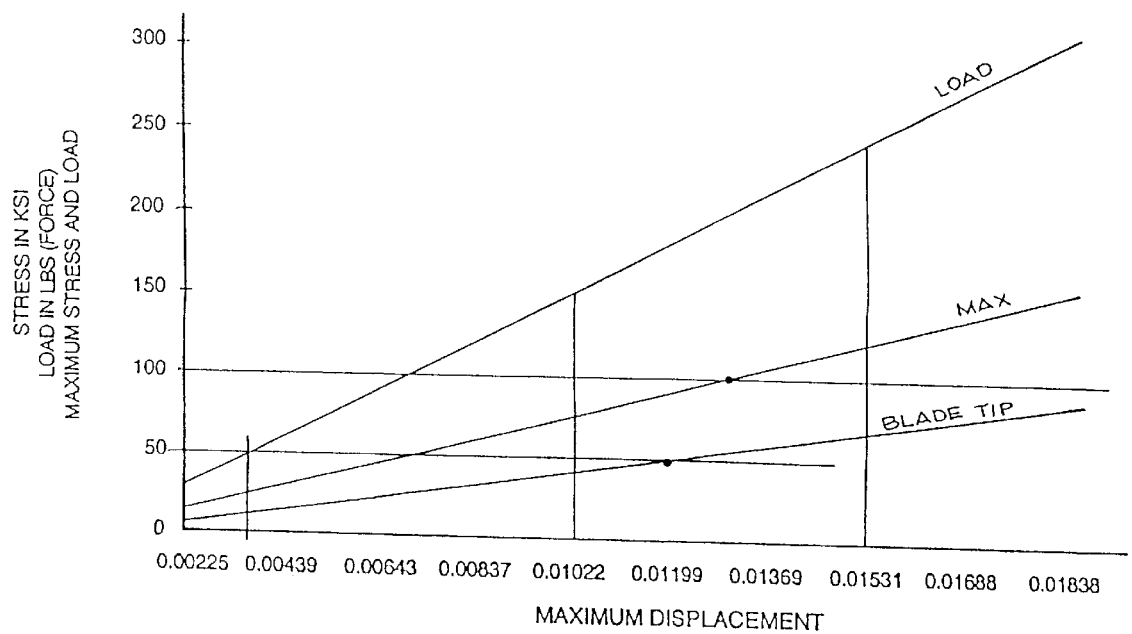
FIG. 7, which is labeled "Prior Art", is a graph representing load, maximum stress and blade tip stress as a function of displacement at the blade tip for a known blade mounting structure.
Figure 8:
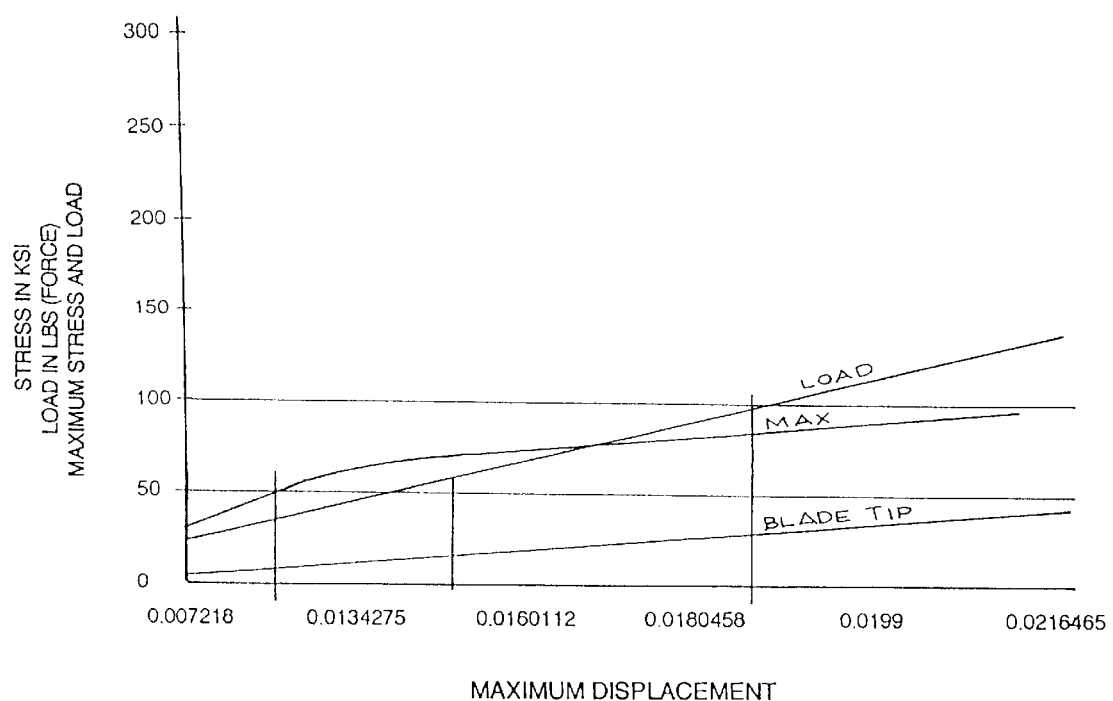
FIG. 8 is a graph representing load, maximum stress and blade tip stress as a function of displacement at the blade tip for the blade mounting structure provided by the invention.

Referring now to FIG. 7, which is labeled "Prior Art", is a graph representing load at the blade tip, blade tip stress and maximum stress on the blade with respect to displacement of the tip of the cutoff blade for the known blade mounting structure disclosed in U.S. Pat. No. 3,733,949, and which is illustrated in schematic form in FIG. 6. FIG. 8 is a similar graph representing load at the tip of the cutoff blade, blade tip stress and maximum stress on the blade with respect to displacement of the blade tip for the blade mounting structure provided by the invention and which includes the multi-section elastomeric member 30 located between the cutoff blade 12 and the roll 14. By comparing the graph of FIG. 8 with the graph of FIG. 7, it can be seen that with applicants' mounting arrangement, a lower loading force can be used to provide a given deflection, as represented by blade tip displacement. Moreover, the maximum stress is not proportional to displacement. For a given displacement of the blade tip, the maximum stress is significantly less than that for the conventional blade mounting arrangement. For example, the conventional mounting arrangement requires a load of about 150 pounds (force) to provide a 0.010 inch deflection of the blade tip, and a load of about 250 pounds (force) to provide a 0.015 inch deflection of the blade tip. In contrast, for applicants' blade mounting arrangement providing a blade tip deflection of 0.010 inch requires a load of only about 50 pounds (force), and providing a blade tip deflection of 0.015 inch requires a load of about 60 pounds (force). Moreover, in providing blade tip deflections of 0.010 inch and 0.015 inch using the prior art mounting arrangement, the load of 150 pounds (force) results in a maximum stress of about 75 ksi (i.e., $10^3$ psi) and the load of 250 pounds (force) results in a maximum stress of about 125 ksi. Using applicants' blade mounting arrangement, the load of 50 pounds (force) which provides a blade tip deflection of about 0.010 inch, results in a maximum stress of about 50 ksi. The load of 60 pounds (force), which provides a blade tip deflection of 0.015 inch, results in a maximum stress of only about 75 ksi. Thus, with applicants' blade mounting arrangement, the same level of blade tip deflection, which correlates to cutting interference, is realized without a proportional increase in stress forces.

The data used to construct the characteristics of FIGS. 7 and 8 can be determined, for example, using conventional computer analysis such as the ANSYS finite element program. This program allows the cutting force, blade deflection or cutting interference, and blade stress concentration relationship to the illustrated and quantified. The graphs illustrate the relationship of force, deflection and stress values and stress concentration location.

A comparison of process parameters of applicants' blade mounting arrangement with those of existing technology, as exemplified by the blade mounting structure disclosed in U.S. Pat. No. 3,733,949, for example, illustrates the improved relationship between deflection and force. In the disclosed embodiment, the blade mounting arrangement of U.S. Pat. No. 3,733,949 provides a blade tip displacement of 0.010 inch. This requires a load force on the top of the cutoff blade of about 150 pounds (force). The concentrated stress at the tip of the blade is about 40 ksi and the maximum stress on the blade is about 75 ksi. For applicants' blade mounting arrangement, a cutoff blade tip displacement of 0.010 inch is provided with a load force of only about 50 pounds (force). Moreover, the resultant concentrated stress at the tip of the cutoff blade is only about 10 ksi, and the maximum stress on the cutoff blade is about 50 ksi. Thus, the same level of deflection, or cutting interference, can be realized without a proportional increase in stress forces.

This change in deflection vs. force relationship provides several advantages. For example, the system tolerances are substantially improved because the cut-off system has a greater bandwidth. Moreover, larger operating interferences, which correlate with blade deflection, are allowed without the proportional increase in cutting force in the existing technology and consequential vibration effects. In addition, cutting system adjustments due to blade wear do not have to be as frequent. The added deflection of the blade gives more allowance in acceptable cutting performance while maintaining lower force levels and blade stress levels and vibration levels. The geometric configuration of the strip of elastomeric material changes the distribution in stress in the blade. For given deflection values, the stress distribution produced using applicants' blade mounting arrangement is more evenly distributed and is not proportional to the force as compared to the existing technology. Therefore, stress concentration is reduced, thereby increasing fatigue limits.

The blade mounting arrangement provided by the present invention greatly reduces the level of maximum stress in the cutoff blade which significantly increases the blade life. Moreover, the blade mounting arrangement provided by the invention has the ability to damp vibration and reduce noise in cut-off because of the geometry and physical properties of the support material.

We claim:

1. A blade assembly for a shear cut roll for perforating or cutting sheet material, comprising:
    a blade having an upper surface and a lower surface;
    a blade mount securing the blade to the roll;
    an elastomeric member located between the lower surface of the blade and the roll, the elastomeric member being configured and arranged to provide varying resistance to compressive loading, the resistance varying along a portion of the elastomeric member.

2. A blade assembly for a shear cut roll for perforating or cutting sheet material, comprising:
    a blade having an upper surface and a lower surface;
    a blade mount securing the blade to the roll;
    an elastomeric member located between the lower surface of the blade and the roll, the elastomeric member having a thickness varying along a longitudinal axis of the elastomeric member.

3. A blade assembly for a shear cut roll for perforating or cutting sheet material, comprising:
    a blade having an upper surface, a lower surface, and a blade width;
    a blade mount securing the blade to the roll;
    an elastomeric member located between the lower surface of the blade and the roll, the elastomeric member having a thickness varying along the width of the elastomeric member.

4. The blade assembly as claimed in claim 3, wherein the blade has a free end which is impacted during normal operation of the shear cut roll.

5. The blade assembly as claimed in claim 4, wherein the blade has a loaded state in which the blade is impacted and an unloaded state, the free end of the blade being flexed toward the elastomeric member responsive to load upon the blade.

6. The blade assembly as claimed in claim 5, wherein at least a part of the elastomeric material is compressed by the blade when the blade is flexed under load.

7. The blade assembly as claimed in claim 6, wherein the elastomeric member, in response to deformation of the blade under load, exerts a distribution of reactive loads against the lower surface of the blade, the reactive loads having magnitudes corresponding to the thickness of the elastomeric element at respective points along the width of the blade.

8. The blade assembly as claimed in claim 4, wherein the elastomeric member has at least two sections along the width of the elastomeric member, the at least two sections having different thicknesses.

9. The blade assembly as claimed in claim 8, wherein at least one section of the elastomeric member does not contact the blade in normal operation of the shear cut roll.

10. The blade assembly as claimed in claim 4, wherein the elastomeric member has an upper surface defining a range of thicknesses along the width of the elastomeric member.

11. The blade assembly as claimed in claim 10, wherein the upper surface of the elastomeric member includes at least one portion which is stepped with respect to remaining portions of the upper surface.

12. The blade assembly as claimed in claim 3, wherein the blade is secured by the blade mount to the roll in a cantilevered fashion, the blade having a first end secured to the roll and a second unsecured end which is impacted during normal operation of the shear cut roll.

13. The blade assembly as claimed in claim 12, wherein a portion of the elastomeric member is located adjacent to the lower surface of the blade near the first end of the blade.

14. The blade assembly as claimed in claim 13, wherein the first end of the blade is at least partially supported by the portion of the elastomeric member.

15. The blade assembly as claimed in claim 13, wherein the elastomeric member has three sections of different thicknesses along the width of the elastomeric member.

16. The blade assembly as claimed in claim 15, wherein a first section of the elastomeric member is located near a first end of the blade opposite the free end of the blade, a second section of the elastomeric member is located near the free end of the blade, and a third section of the elastomeric member is located between the first section and the second section.

17. The blade assembly as claimed in claim 16, wherein the width of the elastomeric member is smallest at the third section, largest at the first section, and intermediate at the second section.

18. The blade assembly as claimed in claim 3, wherein the elastomeric member has an upper surface facing the lower surface of the blade, the upper surface of the elastomeric member having at least one projection which contacts the lower surface of the blade in normal operation of the shear cut roll.

19. A blade mounting arrangement for mounting a blade on a roll of a shear cut type, cut-off system for perforating or cutting web material, the blade having a first edge and a second edge, and the cut-off apparatus including an anvil, said blade mounting arrangement comprising:

a blade holder for securing the blade to a mounting surface of the roll with the first edge of the blade oriented to be impacted by the anvil to flex the blade during rotation of the roll, subjecting the blade to a load force; and a member of an elastomeric material interposed between the blade and the mounting surface of the roll, the elastomeric member being configured and arranged to provide varying resistance to compressive loading, the resistance varying along a portion of the elastomeric member.

20. The blade mounting arrangement according to claim 19, wherein the thickness of the elastomeric member is different along the width of the elastomeric member.

21. The blade mounting arrangement according to claim 19, wherein the elastomeric member includes a first portion located in underlying relation with the blade near its first edge, and a second portion located in underlying relation with the blade near its second edge, the first portion being spaced from the first edge of the blade providing a gap therebetween when the load force applied to the blade is less than a predetermined value, and the first portion of the elastomeric member being engaged by the first edge of the blade and compressed by the first edge of the blade when a load force greater than said predetermined value is applied to the first edge of the blade.

22. The blade mounting arrangement according to claim 21, wherein the elastomeric member includes a third portion disposed intermediate the first and second portions, the thickness of the second portion being greater than the thickness of the first portion, and the thickness of the first portion being greater than the thickness of the third portion.

23. The blade mounting arrangement according to claim 22, wherein the width of the second portion is greater than the width of the first portion, and the width of the first portion is greater than the width of the third portion.

24. The blade mounting arrangement according to claim 22, wherein the first and second portions are integral with the third portion.

25. A shear cut type, cut-off system for perforating or cutting a moving web of material, said system comprising:

a member of an elastomeric material;

a fixed blade having an edge;

a cutoff blade assembly including a cutoff blade and a roll having an axial recess in a surface thereof, the cutoff blade having a fixed inner edge mounted in the recess of the roll and an inclined outwardly extending free outer edge provided with a cutting edge, the roll being adapted for rotation relative to the fixed blade; and the fixed blade having a cutting edge positioned radially inwardly of the path of travel of the cutting edge of the cutoff blade to bring the free outer edge of the cutoff blade into engagement with the edge of the fixed blade during rotation of the roll, subjecting the cutoff blade to a load force, whereby the cutoff blade is flexed, compressing the elastomeric member;

the elastomeric member being positioned in the recess in the roll, the elastomeric member being configured and arranged to provide varying resistance to compressive loading, the resistance varying along a portion of the elastomeric member.

26. The blade mounting arrangement according to claim 25, wherein the elastomeric member defines a first resistance portion which engages the cutoff blade near its fixed inner edge and a second resistance portion for engaging the cutoff blade near it free outer edge only when the cutoff blade is subjected to a load force that is greater than a predetermined value.

27. The blade mounting arrangement according to claim 26, wherein the elastomeric member includes a third portion disposed intermediate the first and second portions and joining the first portion to the second portion, the third portion being configured so as to be maintained out of engagement with the cutoff blade when a load force is applied to the free outer edge of the cutoff blade.

28. A method for controlling load force in a blade of a shear cut type cut-off system, the blade having a free portion which is subjected to a load force which deflects the blade in use, said method comprising the steps of:

mounting the blade to a mounting surface of a roll;

providing an elastomeric member having a property that is non-uniform at least along the width of the elastomeric member;

interposing the elastomeric member between the free portion of the blade and the mounting surface of the roll; and selecting said property to provide varying resistance to compressive loading, the resistance varying along a portion of the elastomeric member.

29. The method according to claim 28, wherein said property is the thickness of the elastomeric member, and wherein the step of selecting said property includes varying the thickness of the elastomeric member along the width of the elastomeric member.

* * * * *